Patented Jan. 20, 1925.

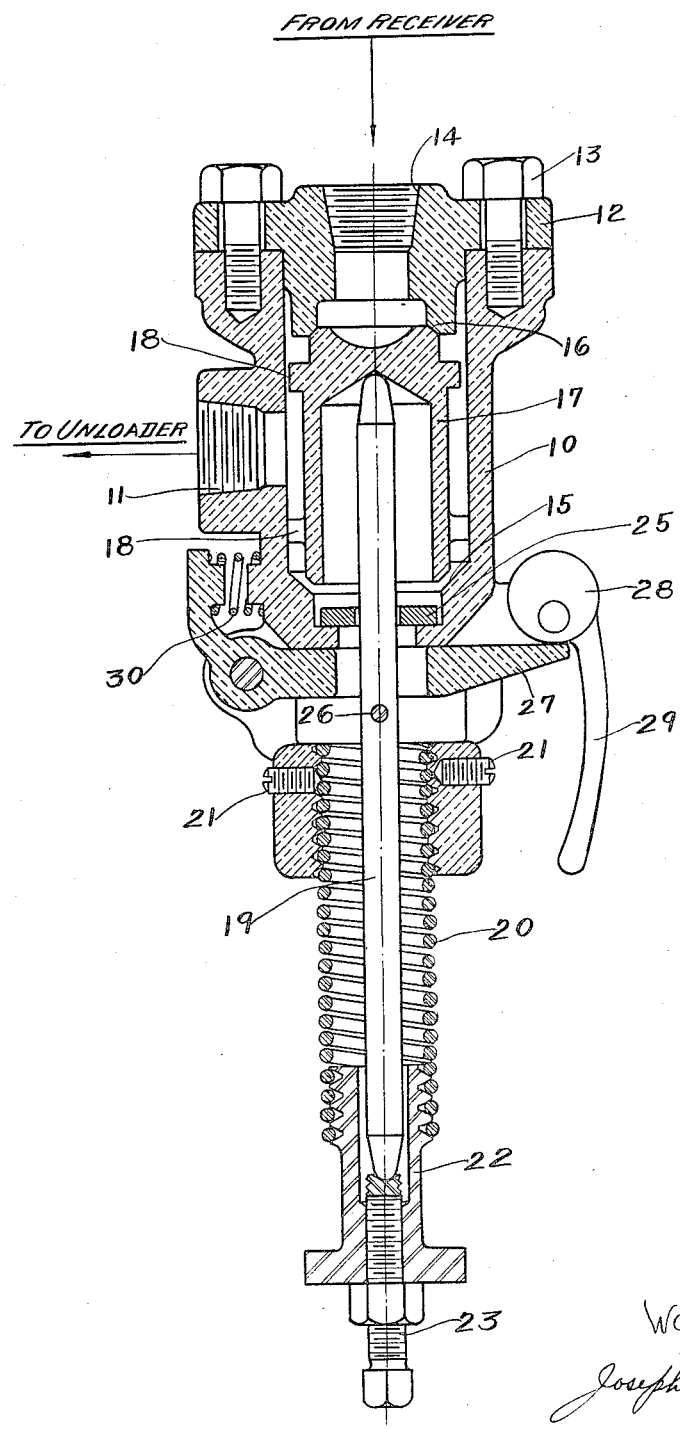

1,523,716

UNITED STATES PATENT OFFICE.

WARD RAYMOND, OF EASTON, PENNSYLVANIA, ASSIGNOR TO PENNSYLVANIA PUMP & COMPRESSOR COMPANY, OF EASTON, PENNSYLVANIA, A CORPORATION OF PENNSYLVANIA.

REGULATOR VALVE FOR COMPRESSORS.

Application filed December 31, 1923. Serial No. 683,559.

*To all whom it may concern:*

Be it known that I, WARD RAYMOND, a citizen of the United States, and a resident of Easton, in the county of Northampton and State of Pennsylvania, have invented a new and useful Improvement in a Regulator Valve for Compressors, of which the following is a specification.

This invention relates to regulator valves for compressors and particularly to a pilot valve for controlling the unloading devices for a compressor.

An object of the present invention is to provide an improved form of pilot valve for controlling the unloading devices of a compressor whereby the discharge pressure of the compressor can be accurately controlled.

It is also an object of the invention to provide simple means for controlling the differences in pressures between which the unloaders are rendered inoperative and operative.

One feature which enables me to accomplish the above named objects is the means for regulating the effective length of the pressure controlling spring. By rotation of a nut threaded upon the controlling spring it renders more or less of the convolutions of the spring ineffective. This, therefore, affects the resiliency of the spring and therefore makes it more or less sensitive in its operation. The tension change in the spring during the travel of the valve between its two fixed seats is therefore adjustable.

Another feature of importance is that the valve within the regulator body member always moves the same distance in all adjustments and also operates between fixed seats and its movement is always sufficient to give a full opening for the regulating fluid passing through the regulator.

Another object of the invention is to provide mechanical means manually operable to hold the regulator valve in position holding the valve open and the compressor unloaded.

A still further object of the invention is to restrict the passage of regulating fluid through the regulator after the valve has been moved to its closed position and the unloading devices are being reopened.

With these and other objects in view my invention consists in the features of construction and operation set forth in the following specification and illustrated in the accompanying drawing.

In the accompanying drawing annexed hereto and forming a part of this specification, I have shown by invention in a regulator of preferred form but it will be understood that the invention can be otherwise embodied, and that the drawing is not to be construed as defining or limiting the scope of the invention; the claims appended to this specification being relied upon for that purpose.

In the drawing the figure shows a vertical central section taken through the complete regulator.

In the above mentioned drawing I have shown but one embodiment of the invention which is now deemed preferable, but it is to be understood that changes and modifications may be made within the scope of the appended claims without departing from the spirit of the invention.

Briefly, my invention in its broadest aspect comprises the following principal parts: first, a body member; second, two fixed valve seats therein, one preferably being formed integrally and the other formed in a cover plate directly attached thereto; third, a valve therein and movable between said seats and adapted to open communication between openings formed in the body member; fourth, a spring-pressed rod normally holding the valve in one position; fifth, a spring preferably surrounding the rod; sixth, a nut threaded on the spring so that the effective length of the spring may be varied; seventh, a lever adapted to engage a member on said rod whereby the rod may be moved against the tension of the spring; and eighth, a plate having an opening therein and surrounding the rod to restrict the passage of fluid past the valve when it is in one of its operative positions.

Referring more in detail to the figure of the drawing, I provide a body member 10 having an opening 11 adapted to be connected to unloading devices of a compressor. The body member 10 is provided with a cover plate 12 adapted to be fastened to the body member 10 by suitable screws 13. This cover 12 is provided with an opening 14 adapted to be connected to a receiver of a compressor, the pressure of which is to be regulated. Within the body member 10 is provided a valve seat 15, which, as shown, is formed integrally in this body member. Another valve seat 16 is provided in the cover 12. The valve seats 15 and 16 are oppositely disposed and so spaced that a valve 17 may operate between them. The positions of both of these valve seats 15 and 16 are permanently fixed and the distance between them is such that the valve 17 may operate properly between them.

The valve 17 is provided with carefully surfaced portions at opposite ends and adapted to contact with the valve seats 15 and 16. The valve also is provided with guiding means in the form of projections 18 to properly position the valve 17 and maintain it centrally within the cavity within the body member. To make the valve 17 as light as possible it is bored out as shown clearly in the drawing.

Normally holding the valve in one of its operative positions is a spring-pressed rod 19, the upper end of which bears against a portion of the valve 17. To force this rod 19 upward is a coiled spring 20 the upper end of which is suitably attached to the lower portions of the body member 10. As shown the upper end of spring 20 may be threaded into a suitably formed opening in the body member 10 and retained in adjusted position by set screws 21. Engaging the lower portion of the spring 20 is a nut 22 having a threaded surface engaging the convolutions of the spring. This nut 22 is not fastened to the spring 20 but is adapted to be adjusted along the spring so that a portion is made ineffective. The nut 22 is also internally threaded for an adjusting screw 23 engaging the lower end of the rod 19.

From the above described mechanism, it will be seen that by adjusting the screw 23 the tension of spring 20 is varied and the pressure of the valve 17 against its upper seat 16 also varied. Also by means of the nut 22 being adjustable along the spring 20, the effective length of the spring and therefore its resiliency is variable. With a shorter effective length of the spring 20, there is a greater variation in tension of the spring during the movement of valve 17 from one seat to the other. Advantage is taken of this variation in resiliency of the spring 20 to control the sensitivity of the regulator.

Under certain conditions it is essential to maintain exceptionally close regulation of the discharge pressure of a compressor. This is accomplished by operating the unloaders to load and unload the compressor between close limits of pressure. I accomplish this loading and unloading action within variable limits of pressure by suitably adjusting the effective length of the spring 20.

The position of the valve 17 shown in the drawing is that during the normal operation of the compressor and while the unloaders are out of operation. As soon as the pressure within the receiver reaches a predetermined maximum, the pressure within the opening 14 and pressing against the valve 17 overcomes the tension of spring 20 and forces the valve 17 downward. This allows fluid to pass from the opening 14 to opening 11 thus operating the unloaders. As soon as the pressure within opening 14 drops a predetermined amount governed by the resiliency of spring 20, this spring 20 compresses and raises valve 17. This movement of the valve cuts off a further supply of fluid to the unloaders causing them to again become inoperative. What fluid there is under pressure in the unloader passages is allowed to exhaust past the lower valve seat 15 to atmosphere.

To govern the flow of this fluid to atmosphere, a removable plate 25 loosely fitting a recess in the body member 10. This plate 25, as shown, loosely surrounds the rod 19 so that a small passage is provided for the exhausting fluid. This restricted opening serves to quicken the action of the valve 17 by allowing pressure to build up under the entire area of the valve 17 which, added to the force of spring 20, quickly moves the valve 17 to its upper or closed position. It will be noted that the area of valve seat 15 is greater than that of seat 16.

It is sometimes desirable to unload a compressor manually as when it is being started or is to be stopped for a long period of time regardless of the pressure within the receiver. For this purpose I mount a pin 26 on the rod 19 which may be engaged by a lever 27 pivoted at one side on the body member 10. This lever 27 may be manually oscillated downward to allow valve 17 to move downward by a cam 28. This cam 28 preferably is in the form of an eccentric and is rotatably mounted on the body member 10 so that its eccentric surface bears against the lever 27. It is also provided with a handle portion 29 to facilitate its operation. To normally hold the lever 27 in its uppermost position against the cam 28 a spring 30 is provided suitably disposed between a portion of the body member 10 and the lever 27.

What I claim is:

1. A regulator valve for compressors comprising in combination, a body member having opposed valve seats therein, said valve seats being maintained in fixed relation to each other, a valve adapted to be actuated between said opposed seats, a spring normally holding said valve against one of said seats, means to vary the tension of said spring, and supplemental means to vary the resiliency of said spring.

2. A regulator valve for compressors comprising in combination, a body member having opposed valve seats therein, said valve seats being maintained in fixed relation to each other, a valve adapted to be actuated between said opposed seats, a helical spring normally holding said valve against one of said seats, means to vary the tension of said spring, and means to render a portion of said spring inoperative whereby the resiliency thereof may be varied.

3. A regulator valve for compressors comprising in combination, a body member having opposed valve seats therein, said valve seats being maintained in fixed relation to each other, a valve adapted to be actuated between said opposed seats, a helical spring normally holding said valve against one of said seats, means to vary the tension of said spring, and means threadedly engaging said spring and movable therealong whereby portions of said spring may be rendered inoperative and the resiliency thereof may be varied.

4. A regulator valve for compressors comprising in combination, a body member having opposed valve seats therein, a valve adapted to be actuated between said opposed seats, fluid conduits extending through said body member and adapted to be opened and closed by movement of said valve, a spring-pressed rod normally holding said valve against one of its seats, a lever positioned to contact with a part fixed to said rod, a cam engaging said lever whereby rotation of said cam moves said rod and valve and retains them in their opposite positions, and a spring normally holding said lever out of contact with said part fixed to said rod.

5. A regulator valve for compressors comprising in combination, a body member having opposed valve seats and an opening, a valve adapted to be actuated between said opposed seats, movement of said valve to one position opening communication between one valve seat and the opening, and movement to the other position opening communication between the opening and the atmosphere, and means loosely retained within said regulator body member to restrict the passage of fluid from said opening to atmosphere.

6. A regulator valve for compressors comprising in combination, a body member having opposed valve seats and an opening, a valve adapted to be actuated between said opposed seats, movement of said valve to one position opening communication between one valve seat and the opening, and movement to the other position opening communication between the opening and the atmosphere, and an annular member removably placed in said regulator body member to restrict the passage of fluid from said opening to atmosphere.

7. A regulator valve for compressors comprising in combination, a body member having two opposed fixed valve seats therein, a valve adapted to be actuated between said opposed seats and having a constant travel between them, a spring normally holding said valve against one of said seats, and means to vary the increment of tension in the spring during the travel of the valve.

8. A regulator valve for compressors, comprising in combination, a body member having opposed valve seats therein, said valve seats being maintained in fixed relation to each other, a valve adapted to be actuated between said opposed seats and having a constant travel between them, a helical spring normally holding said valve against one of said seats, means to vary the increment of tension in the spring during the travel of the valve between the seats, and means to vary the total tension of the spring.

In testimony whereof, I hereunto affix my signature.

WARD RAYMOND.